No. 817,777. PATENTED APR. 17, 1906.
J. HOPKINSON.
PRICE SCALE.
APPLICATION FILED DEC. 15, 1905.
2 SHEETS—SHEET 2.
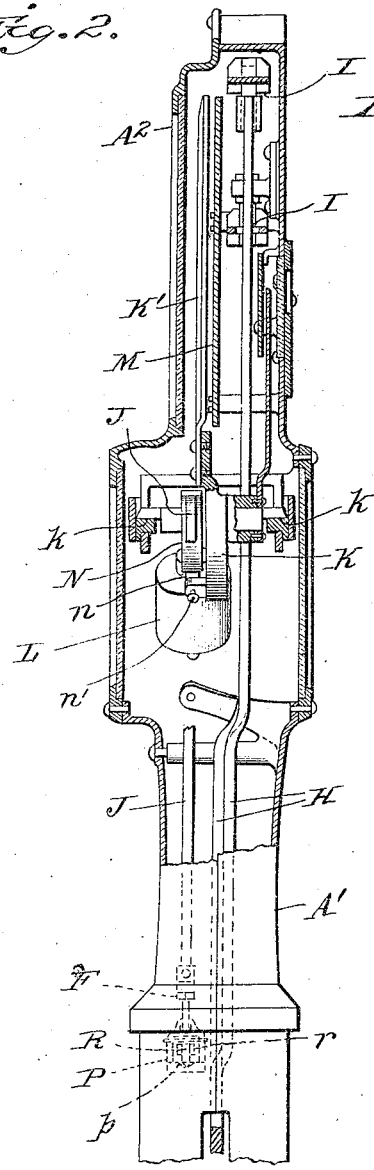
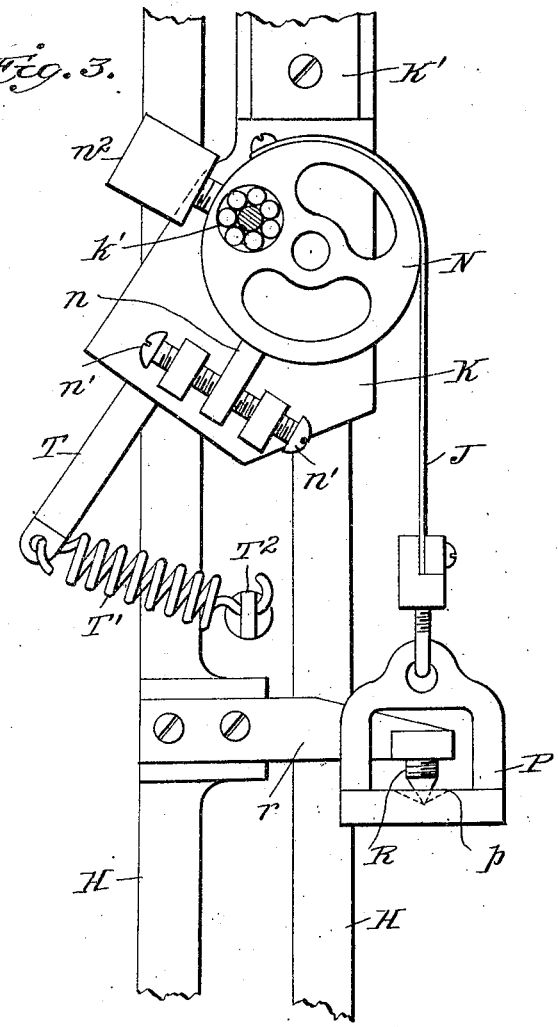
Witnesses
Edwin L. Yewell
Thomas Durant
Inventor
Joseph Hopkinson,
By Church & Church
his Attorneys

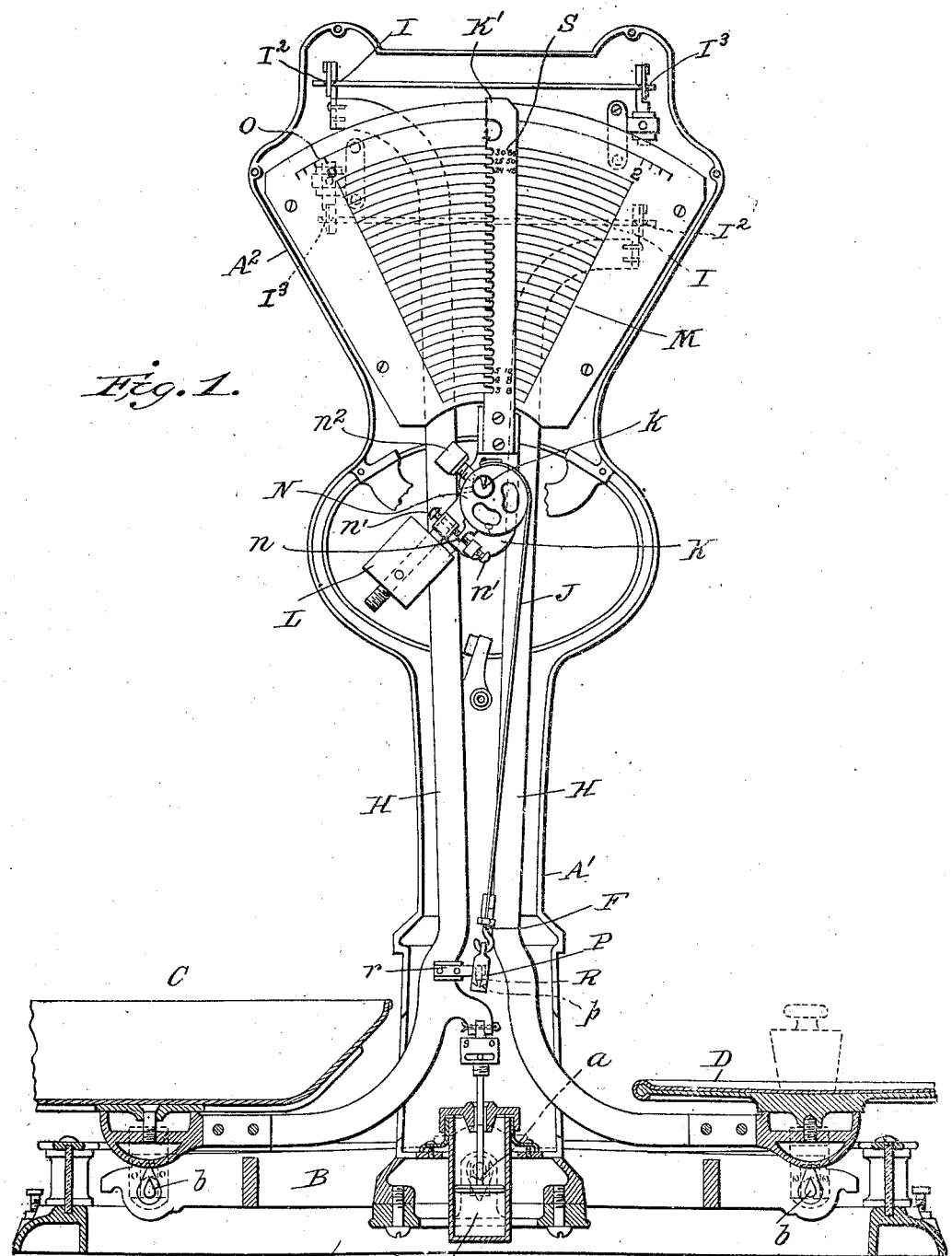

UNITED STATES PATENT OFFICE.

JOSEPH HOPKINSON, OF DAYTON, OHIO, ASSIGNOR TO THE COMPUTING SCALE COMPANY, OF DAYTON, OHIO, A CORPORATION OF OHIO.

PRICE-SCALE.

No. 817,777. Specification of Letters Patent. Patented April 17, 1906.

Application filed December 15, 1905. Serial No. 291,855.

*To all whom it may concern:*

Be it known that I, JOSEPH HOPKINSON, a resident of Dayton, in the county of Montgomery, State of Ohio, have invented certain new and useful Improvements in Price-Scales; and I do hereby declare the following to be a full, clear, and exact description of the same, reference being had to the accompanying drawings, forming part of this invention, and to the letters of reference marked thereon.

This invention relates to price-scales, and has for its object the production of a scale of the even-balance type, but having the capacity to indicate values of goods at different prices per unit.

A further object of the invention is to provide a scale of the type mentioned with an indicator movable angularly in a vertical plane to indicate both fractional values and fractional weights.

The invention contemplates the employment of an even-balance scale mechanism, preferably of the equal-arm type, with a goods receiver or pan on one side and the receiver for the counterweights on the opposite side of the fulcrum and a price and value indicating mechanism controlled and operated by the check devices employed for maintaining the pan in upright position, said price and value indicating mechanism embodying a segmental chart and an indicator movable angularly with relation thereto to indicate value at different rates, a differential counterbalance device being introduced to resist the movement in proportion to the weight of the article being weighed.

The invention consists generally in an even-balance scale combined with a differential counterbalancing mechanism operating to control an indicator for indicating values when the scale is overloaded or loaded beyond the balancing-point.

The invention further consists in certain novel details of construction and combinations and arrangements of parts, all as will be now described, and pointed out particularly in the appended claims.

Referring to the accompanying drawings Figure 1 is a front elevation, partly broken away and partly in section, of a scale embodying the present improvements. Fig. 2 is a sectional elevation at right angles to Fig. 1. Fig. 3 is a detail view of a modified arrangement of the differential counterbalance.

The scale adopted for illustrating the present invention embodies a base A, having central bearings $a$ for the equal-arm lever B, and a vertical standard A', terminating at the top in a housing A² for the indicating and differential counterbalancing mechanisms. The equal-arm lever B carries at the ends the usual knife-edge pivots $b$, those at one end supporting the goods-receiver or pan C and those at the opposite end supporting the counterweight-receiver D.

The usual check stems and links are omitted from the present scale, and the receivers are held in horizontal parallelism by check arms or stems H, connected rigidly with the receivers and extending vertically in the central standard, their upper ends being pivotally connected by check-links I with the said standard. The check-links should have a radius approximately equal to the radius of the scale-lever B and extend in substantially horizontal planes in order to preserve the horizontal parallelism of the pan and weight-receiver without introducing appreciable frictional resistance or irregularity in the action of the scale. The check-links I extend in opposite directions from the arms H, each being pivotally connected at one end I² to the upper end of its arm and pivotally connected at the opposite end I³ to the frame. The pivotal connections are similar in all respects to the pivotal connections used with check-links in scales as heretofore constructed and no detail description is necessary herein.

The scale as thus far described constitutes an even-balance scale of the equal-arm type, the counterpoise-weights on one arm being adapted to balance a load of equal weight on the other arm of the lever. In order now to make the scale a price-scale, an indicator and differential counterbalance mechanism is introduced, as follows:

An indicator-carrier K is journaled either on knife-edge pivots $k$, Fig. 1, or ball-bearings $k'$, Fig. 3, in the standard, and to one side of this carrier an adjustable counterweight L is secured to operate as a pendulum-weight in counterbalancing the load on the scale. The indicator-arm K' projects at an angle from the carrier in position to register with graduations and value-indicating figures on a segmental chart M in the upper end of the standard or the housing carried by the latter. On the front of the indicator-carrier is an angularly-adjustable eccentric N, to which one end of a flexible connection J is attached, the opposite end of said flexible connection supporting a stirrup P, having a conical bearing $p$ for a pointed pivot R, carried by a bracket $r$ on the upwardly-extending check-arm of the receiver. The eccentric N is mounted on the carrier so as to be adjustable angularly to adjust its leverage, and it is held in position by an arm $n$, clamped between adjusting-screws $n'$ on the carrier K. Slack in the flexible connection may be taken up by an adjustable connection, as at F. To counterbalance the eccentric flexible connection and stirrup, the eccentric is provided with an adjustable weight $n^2$. Thus the scale may be said to have two systems of balanced members, the connection between the systems being formed by the pointed pivot and conical bearing.

In operation the counterbalance L is effective in counterbalancing load on the scale on one side only of the balancing-point, although, as shown, the indicator has a range of movement on both sides of the balancing-point, which latter is indicated by O, the movement on the underbalance side, however, being short, as it is designed simply to enable the indicator to act as a near-weight indicator to warn the salesman of the fact that the load being placed on the receiver is nearly sufficient to balance the scale. It will be noted that the indicator will operate in the manner described regardless of the weight of the removable counterpoise-weights on the weight-receiver. On the overbalance side the indicator has a wide range of movement in the scale illustrated equal to two pounds and the differential counterpoise operates to balance the load to the extent indicated by the chart and indicator, this counterbalancing being supplemental or in addition to the counterbalancing effect of the removable weights, if any of the latter be on the receiver. For all goods within the capacity of the chart and differential counterbalance the removable weights need not be used. In addition to the figures indicating the prices per unit the indicator may have columns of figures, such as at S, indicating the values of the removable counterpoise-weights at the various prices per unit. Thus a salesman knowing which removable weight is on the receiver has only to add its value at the desired rate to the value indicated on the chart at the same rate to arrive at the total value of the goods on the pan.

Obviously the differential counterbalance may be in the form of a spring instead of a pendulum-weight, and in Fig. 3 the carrier K is shown having an arm T, to the end of which a counterbalance-spring T' is secured, the opposite end of the spring being connected to a fixed stud or projection T² in the housing or standard. To check excessive vibration or bring the scale to rest quickly, a dash-pot V of ordinary construction may be employed.

While a particular type of even-balance scale is illustrated and described, it is obvious that the invention is not limited in its application to this particular type, and in the description where the term "receiver" or "weight-receiver" is used it will be understood that any ordinary means for supporting the load or goods to be weighed and the removable weights may be used, the said term being used in a broad sense to include any means for the purpose mentioned.

Having thus described my invention, what I claim as new, and desire to secure by Letters Patent, is—

1. In a price-scale, the combination with the lever pivoted intermediate its ends and the goods and removable counterweight-receivers carried by said lever, of the upwardly-extending check-arms connected with said receivers, links connected with said arms for maintaining the horizontal parallelism of the receivers and an indicator located above the receivers and actuated by one of said arms; substantially as described.

2. In a price-scale, the combination with the counterbalanced lever, the goods-receiver pivotally supported by the lever, the upwardly-extending check-arm connected with the goods-receiver and a link connected with the arm to maintain the goods-receiver in horizontal parallelism, of a pivoted indicator and differential counterbalance and a flexible connection between the same and upwardly-extending check-arm; substantially as described.

3. In a price-scale, the combination with the pivoted lever, a receiver for counter-weights and a receiver for goods pivotally supported on said lever, of a check-arm connected to the goods-receiver and extending above the lever, a link for holding the goods-receiver in horizontal parallelism and a differential counterweight and indicator in operative engagement with the upwardly-extending check-arm; substantially as described.

4. In a scale, the combination with a lever, a receiver pivotally mounted on the lever and having an arm rigid therewith and extending above the lever, said parts constituting a balanced system in the scale, of a differential counterbalancing mechanism an indicator movable in unison with said differential counterbalance mechanism and a connection between said mechanism and the upwardly-extending arm on the receiver; substantially as described.

5. In a scale the combination with a lever, a receiver pivotally mounted on the lever, an arm connected to the receiver and extending above the lever, of a counterbalancing mechanism, and indicator connected therewith pivoted on a fixed axis above the lever, a connection between the arm and said counterbalancing mechanism and a segmental chart having graduations with which the indicator registers; substantially as described.

6. In a price-scale, the combination with a lever, a receiver pivotally supported thereby, and means for counterbalancing the same, of an upwardly-extending arm connected to the receiver, a check-link connected with said arm, a differential counterbalancing mechanism and indicator pivoted on a fixed axis above the lever, a connection between the said counterbalancing mechanism and upwardly-extending arm and a price-chart with which the indicator registers; substantially as described.

7. In a price-scale, the combination with the even-balance lever the receivers on opposite ends of said lever and the vertically-extending standard between the receivers, of arms rigidly connected with the receivers and extending vertically in the standard and check-links connecting the upper ends of said arms and standard; substantially as described.

8. In a price-scale, the combination with the even-balance lever, the receivers on opposite ends of said lever and the vertically-extending standard between the receivers, of arms rigidly connected with the receivers and extending vertically in the standard, check-links between the arms and standard, a counterbalancing and price-indicating mechanism in the upper end of the standard and a connection between the counterbalancing and indicating mechanisms and one of the arms; substantially as described.

9. In a scale, a balance-lever, a receiver pivoted thereon, a differentially-counterbalanced indicator pivotally supported independently of the lever, and operating connections independent of and separated from the lever between said indicator and receiver; substantially as described.

10. In a scale, a balance-lever, a receiver pivotally mounted thereon, a check-arm and link for holding the receivers in horizontal parallelism, a differentially-counterbalanced indicator pivotally supported independently of the lever and operating connections between the said arm and indicator; substantially as described.

11. In a scale, a balance-lever, receivers pivotally mounted on opposite ends thereof, check arms and links for holding the receivers in horizontal parallelism, an indicator and pendulum-counterweight pivotally supported independent of the lever and operating connections between one of said check-arms and the indicator and pendulum-counterweight; substantially as described.

12. The combination with an even-balance scale embodying receivers an equal-arm lever carrying the same and having a movement on both sides of the balancing-point and upwardly-extending check-arms connected with the receivers, of an indicator, a differential counterbalance movable therewith, a flexible connection intermediate the counterbalance and the check-arm connected with the goods-receiver whereby the differential counterbalance only balances goods placed on the receiver and a value-chart with which the indicator registers to indicate the value of goods balanced by the differential counterbalance; substantially as described.

JOSEPH HOPKINSON.

Witnesses:
H. M. WALSH,
S. L. McKEE.